(12) United States Patent
Shutzberg et al.

(10) Patent No.: US 10,139,975 B2
(45) Date of Patent: Nov. 27, 2018

(54) PRESSURE COMPENSATION FOR FORCE-SENSITIVE TOUCH SCREEN

(71) Applicant: Apple Inc., Cupertino, CA (US)

(72) Inventors: Julian Kevin Shutzberg, San Francisco, CA (US); Adam Monkowski, Pleasanton, CA (US); Baboo Gowreesunker, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/390,219

(22) Filed: Dec. 23, 2016

(65) Prior Publication Data

US 2018/0088702 A1 Mar. 29, 2018

Related U.S. Application Data

(60) Provisional application No. 62/398,637, filed on Sep. 23, 2016.

(51) Int. Cl.
*G06F 3/044* (2006.01)
(52) U.S. Cl.
CPC .... *G06F 3/044* (2013.01); *G06F 2203/04101* (2013.01); *G06F 2203/04105* (2013.01)
(58) Field of Classification Search
CPC .......... G06F 3/044; G06F 2203/04101; G06F 2203/04105
See application file for complete search history.

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| CN | 205038623 U | 2/2016 |
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Stephen G Sherman
(74) *Attorney, Agent, or Firm* — Morrison & Foerster LLP

(57) ABSTRACT

Pressure compensation can be used to improve performance of force-sensitive touch screens. Changes in pressure, particularly transient, internal pressure changes in an electronic device due to an object applying force to a touch screen of the electronic device, can degrade force sensing performance of the touch screen. For example, when a finger presses a force-sensitive touch screen of a sealed electronic device, the applied force can increase internal pressure of the sealed electronic device until internal pressure can equalize. The increased internal pressure can cause a normal force to oppose the deflection of the touch screen, resulting in inaccurate force measurements of applied user force. In some examples, an electronic device including a force-sensitive touch screen can include a pressure sensor configured to measure internal pressure of the electronic device. The measured pressure can be used to compensate the amount of force measured by the force sensor.

20 Claims, 10 Drawing Sheets

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |
| 8,479,122 | B2 | 7/2013 | Hotelling et al. |
| 2005/0110765 | A1* | 5/2005 | Baeza ............... G06F 1/182 345/173 |
| 2006/0065973 | A1* | 3/2006 | Dallenbach ............ G01B 7/22 257/712 |
| 2006/0197753 | A1 | 9/2006 | Hotelling |
| 2009/0114041 | A1* | 5/2009 | Harish ............. G06Q 10/087 73/862.626 |
| 2009/0120198 | A1* | 5/2009 | Dallenbach ............ G01G 7/06 73/780 |
| 2013/0257817 | A1 | 10/2013 | Yliano |
| 2014/0260550 | A1 | 9/2014 | Kil et al. |
| 2015/0007016 | A1 | 1/2015 | Lee et al. |
| 2017/0153760 | A1* | 6/2017 | Chawda ............ G06F 3/0418 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

PRESSURE COMPENSATION FOR FORCE-SENSITIVE TOUCH SCREEN

CROSS-REFERENCE TO RELATED APPLICATIONS

This application claims benefit of U.S. Provisional Patent Application No. 62/398,637, filed Sep. 23, 2016, which is hereby incorporated by reference in its entirety.

FIELD OF THE DISCLOSURE

This relates generally to force-sensitive inputs for electronic devices and, more specifically, to pressure compensation for force-sensitive touch screens.

BACKGROUND OF THE DISCLOSURE

Many types of input devices are presently available for performing operations in a computing system, such as buttons or keys, mice, trackballs, joysticks, touch electrode panels, touch screens and the like. Touch screens, in particular, are becoming increasingly popular because of their ease and versatility of operation as well as their declining price. Touch screens can include a touch electrode panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch electrode panel using a finger, stylus or other object at a location often dictated by a user interface (UI) being displayed by the display device. In general, touch screens can recognize a touch and the position of the touch on the touch electrode panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

In some examples, touch panels/touch screens may include force sensing capabilities—that is, they may be able to detect an amount of force with which an object is touching the touch panels/touch screens. These forces can constitute force inputs to electronic devices for performing various functions, for example.

SUMMARY OF THE DISCLOSURE

This relates to pressure compensation for force-sensitive touch screens according to examples of the disclosure. Changes in pressure, particularly transient, internal pressure changes in an electronic device due to an object applying force to a surface of a touch screen of the electronic device, can degrade performance (e.g., accuracy) of the force sensing capabilities of the electronic device. For example, when a finger presses a force-sensitive touch screen of a sealed electronic device, the applied force can increase internal pressure of the sealed electronic device until internal pressure can equalize. The increased internal pressure can cause a normal force to oppose the deflection of the touch screen, resulting in inaccurate force measurements of applied user force. In some examples, an electronic device including a force-sensitive touch screen can include a pressure sensor configured to measure internal pressure of the electronic device. The measured pressure can be used to compensate the amount of force measured by the force sensor. In some examples, pressure compensation can be applied when an object is detected in contact with the force-sensitive touch screen (e.g., when pressure differentials resulting in a normal force typically occur). In some examples, the pressure compensation can include determining a contribution of measured gap attributable to the measured pressure and compensating the amount of force based on the pressure contribution.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to pressure compensation for force-sensitive touch screens according to examples of the disclosure. Changes in pressure, particularly transient, internal pressure changes in an electronic device due to an object applying force to a surface of a touch screen of the electronic device, can degrade performance (e.g., accuracy) of the force sensing capabilities of the electronic device. For example, when a finger presses a force-sensitive touch screen of a sealed electronic device, the applied force can increase internal pressure of the sealed electronic device until internal pressure can equalize. The increased internal pressure can cause a normal force to oppose the deflection of the touch screen, resulting in inaccurate force measurements. In some examples, an electronic device including a force-sensitive touch screen can include a pressure sensor configured to measure internal pressure of the electronic device. The measured pressure can be used to compensate the amount of force measured by the force sensor. In some examples, pressure compensation can be applied when an object is detected in contact with the force-sensitive touch screen (e.g., when pressure differentials resulting in a normal force typically occur). In some examples, the pressure compensation can include determining a contribution of measured gap attributable to the measured pressure and compensating the amount of force based on the pressure contribution.

Figure 1A:
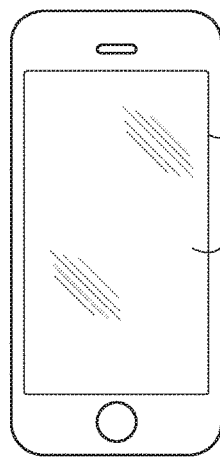
FIGS. 1A-1E illustrate exemplary systems with a force-sensitive touch screen that can implement pressure compensation according to examples of the disclosure.
Figure 1B:
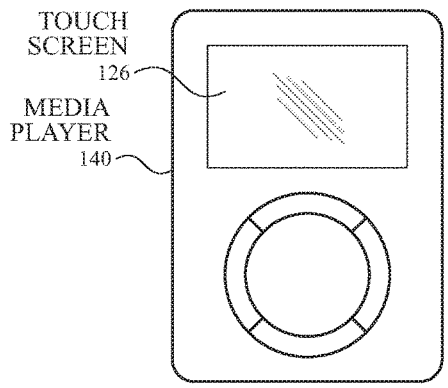
Figure 1C:
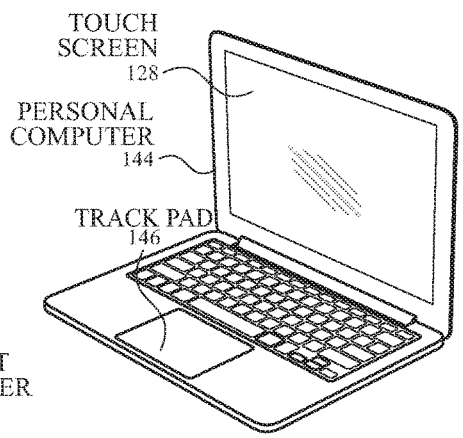
Figure 1D:
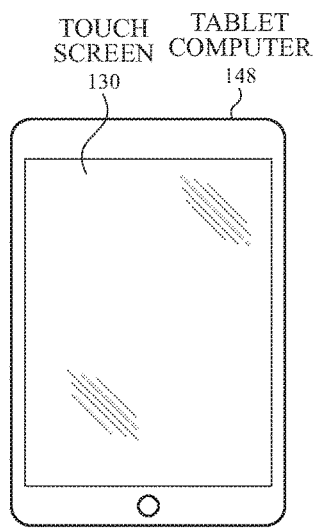
Figure 1E:
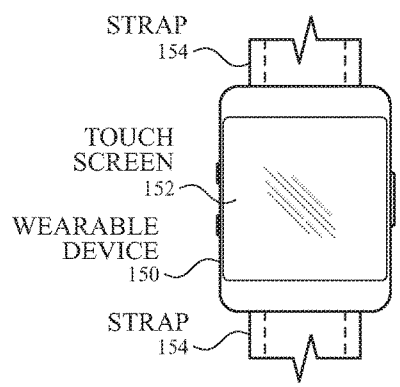

FIGS. 1A-1E illustrate exemplary systems with a force-sensitive touch screen that can implement pressure compensation according to examples of the disclosure. FIG. 1A illustrates an exemplary mobile telephone 136 that includes a force-sensitive touch screen 124 and other computing system blocks that can implement pressure compensation according to examples of the disclosure. FIG. 1B illustrates an exemplary digital media player 140 that includes a force-sensitive touch screen 126 and other computing system blocks that can implement pressure compensation according to examples of the disclosure. FIG. 1C illustrates an exemplary personal computer 144 that includes a force-sensitive touch screen 128 (and/or a force-sensitive track pad 146) and other computing system blocks that can implement pressure compensation according to examples of the disclosure. FIG. 1D illustrates an exemplary tablet computing device 148 that includes a force-sensitive touch screen 130 and other computing system blocks that can implement pressure compensation according to examples of the disclosure. FIG. 1E illustrates an exemplary wearable device 150 (e.g., a watch) that includes a force-sensitive touch screen 152 and other computing system blocks that can implement pressure compensation according to examples of the disclosure. Wearable device 150 can be coupled to a user via strap 154 or any other suitable fastener. It should be understood that the example devices illustrated in FIGS. 1A-1E are provided by way of example, and other types of devices can include a force-sensitive touch screen and other computing system blocks that can implement pressure compensation according to examples of the disclosure. Additionally, although the devices illustrated in FIGS. 1A-1E include touch screens, in some examples, the pressure compensated force sensing can be implemented for non-display surfaces (e.g., track pad 146, device housing, etc.).

Touch screens 124, 126, 128, 130 and 152 can be based on, for example, self-capacitance or mutual capacitance sensing technology, or another touch sensing technology. A self-capacitance based touch system can include a matrix of small, individual plates of conductive material that can be referred to as touch node electrodes. For example, a touch screen can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen. Such a touch screen can be referred to as a pixelated self-capacitance touch screen, though it is understood that in some examples, the touch node electrodes on the pixelated touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change. This change in the self-capacitance of the touch node electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

A mutual capacitance based touch system can include, for example, drive regions and sense regions, such as drive lines and sense lines. A mutual capacitance based touch system can include drive and sense lines that may cross over each other on different layers, or may be adjacent to each other on the same layer. The crossing or adjacent locations can be referred to as touch nodes. During operation, the drive line can be stimulated with an AC waveform and the mutual capacitance of the touch node can be measured. As an object approaches the touch node, the mutual capacitance of the touch node can change. This change in the mutual capacitance of the touch node can be detected and measured by the touch sensing system to determine the positions of multiple objects when they touch, or come in proximity to, the touch screen.

In some examples, the touch screen of the disclosure can include force sensing capability in addition to the touch sensing capability discussed above. In the context of this disclosure, touch sensing can refer to the touch screen's ability to determine the existence and/or location of an object touching the touch screen, and force sensing can refer to the touch screen's ability to determine a "depth" of the touch on the touch screen (e.g., the degree of force with which the object is touching the touch screen). In some examples, the touch screen can also determine a location of the force on the touch screen.

Figure 2:
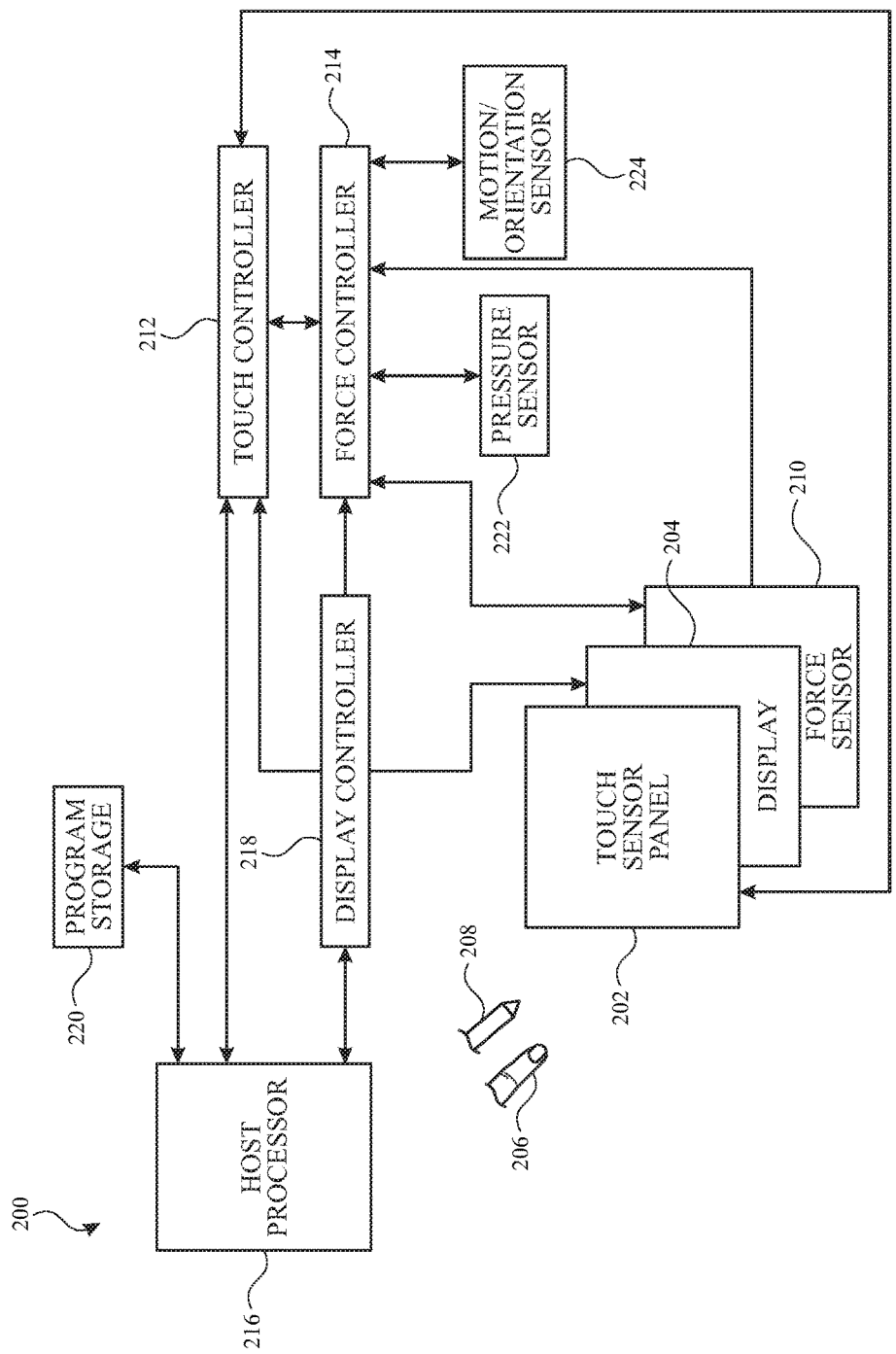
FIG. 2 illustrates a block diagram of an exemplary computing system including a force-sensitive touch screen and capable of implementing pressure compensation according to examples of the disclosure.

FIG. 2 illustrates a block diagram of an exemplary computing system 200 including a force-sensitive touch screen and capable of implementing pressure compensation according to examples of the disclosure. Computing system 200 can include a force-sensitive touch screen and could be included in, for example, mobile telephone 136, digital media player 140, personal computer 144, tablet computing device 148, wearable device 150, or any mobile or non-mobile computing device that includes a force-sensitive touch screen. The force-sensitive touch screen can include a touch sensor panel 202, display 204 and force sensor panel 210. Touch sensor panel 202 can be configured to detect touch and/or proximity (e.g., hover) events from an object (e.g., finger, passive stylus or active stylus) at or proximate to the surface of the touch screen. Touch sensor panel 202 can include a pattern of electrodes to implement various touch sensing scans. The pattern of electrodes can be formed of transparent conductive medium such as Indium Tin Oxide (ITO) or Antimony Tin Oxide (ATO), although other transparent and non-transparent materials, such as copper, can also be used. For example, the touch sensor panel 202 can include an array of touch nodes that can be formed by a two-layer electrode structure (e.g., row and column electrodes) separated by a dielectric material, although in other examples the electrodes can be formed on the same layer. Touch sensor panel 202 can be based on self-capacitance or mutual capacitance or both, as previously described. Display 204 can be configured to display images on the touch screen. Display 204 can use liquid crystal display (LCD) technology, light emitting polymer display (LPD) technology, organic LED (OLED) technology, or organic electro luminescence (OEL) technology, although other display technologies can be used in other examples. Force sensor panel 210 (force sensor circuitry) can be configured to detect force applied by the objects touching the surface of the touch screen, as described in more detail below.

In some examples, the touch sensor panel 202, display 204 and/or force sensor panel 210 can be stacked on top of one another. For example, touch sensor panel 202 can cover a portion or substantially all of a surface of display 204. In some examples, the touch sensor panel 202, display 204 and/or force sensor panel 210 can be partially or wholly integrated with one another (e.g., share electronic components, such as in an in-cell touch screen). In some examples, force sensor panel 210 can measure mutual capacitance between electrodes mounted on the backplane of display 204 (e.g., cover glass electrodes 310 in FIGS. 3A-3D) and electrodes mounted on a proximate flex circuit (e.g., flex layer electrodes 312 in FIGS. 3A-3D).

Computing system 200 can include one or more processors, which can execute software or firmware implementing and synchronizing display functions and various touch, stylus and/or force sensing functions (e.g., force sensing and pressure compensation) according to examples of the disclosure. The one or more processors can include a touch processor in touch controller 212, a force processor in force controller 214 and a host processor 216. Force controller 214 can implement force sensing operations, for example, by controlling force sensor panel 210 (e.g., stimulating one or more electrodes of the force sensor circuitry) and receiving force sensing data (e.g., mutual capacitance information) from the force sensor panel 210 (e.g., from one or more electrodes mounted on a flex circuit). Additionally, force controller 214 can receive accelerometer data from an internal or external accelerometer 224. Additionally, force controller 214 can receive pressure data from an internal pressure sensor 222. In some examples, force controller 214 can implement the force sensing and pressure compensation as described in more detail herein. In some examples, force controller 214 can be coupled to touch controller 212 (e.g., via an I2C bus or and SPI bus) such that touch controller 212 can configure force controller 214 and can receive the force information from force controller 214. Force controller 214 can include the force processor and can also include other peripherals (not shown) such as random access memory (RAM) or other types of memory or storage. In some examples, force controller 214 can include transmit circuitry to stimulated electrodes of the force sensor circuitry, receive circuitry to receive signals from electrodes of the force sensing circuitry and a force scan engine including logic for performing force sensing scans. In some examples, force controller 214 can be implemented as a single application specific integrated circuit (ASIC) including the force processor and peripherals, though in other examples, the force controller can be divided into separate circuits.

Touch controller 212 can be configured to perform touch and/or stylus sensing operations. Touch controller 212 can include the touch processor and can also include peripherals (not shown) such as random access memory (RAM) or other types of memory or storage, watchdog timers and the like. Additionally, touch controller 212 can include receive circuitry (which can include one or more sense channels), panel scan engine (which can include channel scan logic), transmit circuitry (which can include analog or digital driver logic), and a charge pump. The panel scan engine can access RAM, autonomously read data from the sense channels and provide control for the sense channels. The touch controller can also include a scan plan (e.g., stored in RAM) which can define a sequence of scan events to be performed at the touch sensor panel 202. The scan plan can include information necessary for configuring or reconfiguring the transmit circuitry and receive circuitry for the specific scan event to be performed. Results (e.g., touch signals or touch data) from the various scans can also be stored in RAM. In addition, the panel scan engine can provide control for transmit circuitry to generate stimulation signals at various frequencies and/or phases that can be selectively applied to drive regions of the touch sensing circuitry of touch screen. The charge pump can be used to generate the supply voltage for the transmit circuitry. The transmit circuitry (drive circuitry) and receive circuitry (sense circuitry) can be reconfigurable, in some examples, by the panel scan engine based on the scan event to be executed (e.g., mutual capacitance row-column scan, mutual capacitance row-row scan, mutual capacitance column-column scan, row self-capacitance scan, column self-capacitance scan, touch spectral analysis scan, stylus spectral analysis scan, stylus scan, etc.). In one example, during a mutual capacitance scan, drive circuitry can be coupled to each of the drive lines on the touch sensor panel 202 to stimulate the drive lines, and the sense circuitry can be coupled to each of the sense lines on the touch sensor panel to detect changes in capacitance at the touch nodes. The drive circuitry can be configured to generate stimulation signals to stimulate the touch sensor panel one drive line at a time, or to generate multiple stimulation signals at various frequencies, amplitudes and/or phases that can be simultaneously applied to drive lines of touch sensor panel 202 (i.e., multi-stimulation scanning). In some examples, touch controller 212 can be implemented as a single application specific integrated circuit (ASIC) including the touch processor, drive and sense circuitry, and peripherals, though in other examples, the touch controller can be divided into separate circuits. Touch controller 212 can also include a spectral analyzer to determine low noise frequencies for touch and stylus scanning. The spectral analyzer can perform spectral analysis on the scan results from an unstimulated touch sensor panel 202.

Computing system 200 can also include a display controller 218. The display controller 218 can include hardware to process one or more still images and/or one or more video sequences for display on display 204. The display controller 218 can be configured to generate read memory operations to read the data representing the frame/video sequence from a memory (not shown) through a memory controller (not shown), for example. The display controller 218 can be configured to perform various processing on the image data (e.g., still images, video sequences, etc.). In some examples, the display controller 218 can be configured to scale still images and to dither, scale and/or perform color space conversion on the frames of a video sequence. The display controller 218 can be configured to blend the still image frames and the video sequence frames to produce output frames for display. The display controller 218 can also be more generally referred to as a display pipe, display control unit, or display pipeline. The display control unit can be generally any hardware and/or firmware configured to prepare a frame for display from one or more sources (e.g., still images and/or video sequences). More particularly, the display controller 218 can be configured to retrieve source frames from one or more source buffers stored in memory, composite frames from the source buffers, and display the resulting frames on the display 204. Accordingly, display controller 218 can be configured to read one or more source buffers and composite the image data to generate the output frame.

In some examples, the display controller and host processor can be integrated into an ASIC, though in other examples, the host processor 216 and display controller 218 can be separate circuits coupled together. The display controller 218 can provide various control and data signals to the display, including timing signals (e.g., one or more clock signals) and/or vertical blanking period and horizontal blanking interval controls. The timing signals can include a pixel clock that can indicate transmission of a pixel. The data signals can include color signals (e.g., red, green, blue). The display controller 218 can control the display 204 in real-time, providing the data indicating the pixels to be displayed as the display is displaying the image indicated by the frame. The interface to such a display 204 can be, for example, a video graphics array (VGA) interface, a high definition multimedia interface (HDMI), a digital video interface (DVI), a LCD interface, a plasma interface, or any other suitable interface.

Computing system 200 can also include a host processor 216 coupled to touch controller 212 and/or force controller 214. Host processor 216 can receive outputs (e.g., touch and/or stylus sensing data) from touch controller 212 and outputs (e.g., force data) from force controller 214 (e.g., via one or more communication buses, such as a serial peripheral interface (SPI) bus, for example) and perform actions based on the outputs. Host processor 216 can also be connected to program storage 220 and display controller 218. Host processor 216 can, for example, communicate with display controller 218 to generate an image on display 204, such as an image of a user interface (UI), and can use touch controller 212 and force controller 214 to detect a touch on (or near) a touch screen and its associated force, such as a touch and/or force input to the displayed UI. The touch and/or force input can be used by computer programs stored in program storage 220 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 216 can receive outputs (e.g., force information) from force controller 214 and can perform actions based on the outputs that can include previewing the content of a user interface element on which the force has been provided, providing shortcuts into a user interface element on which the force has been provided, or the like. Host processor 216 can execute software or firmware implementing and synchronizing display functions and various touch, stylus and/or force sensing functions. Host processor 216 can also perform additional functions that may not be related to touch/force processing.

Note that one or more of the functions described herein can be performed by firmware stored in memory and executed by one or more processors in touch controller 212, force controller 214, and display controller 218, or stored in program storage 220 and executed by host processor 216. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the computing system 200 is not limited to the components and configuration of FIG. 2, but can include other or additional components in multiple configurations according to various examples. Additionally, the components of computing system 200 can be included within a single device, or can be distributed between multiple devices.

Figure 3A:
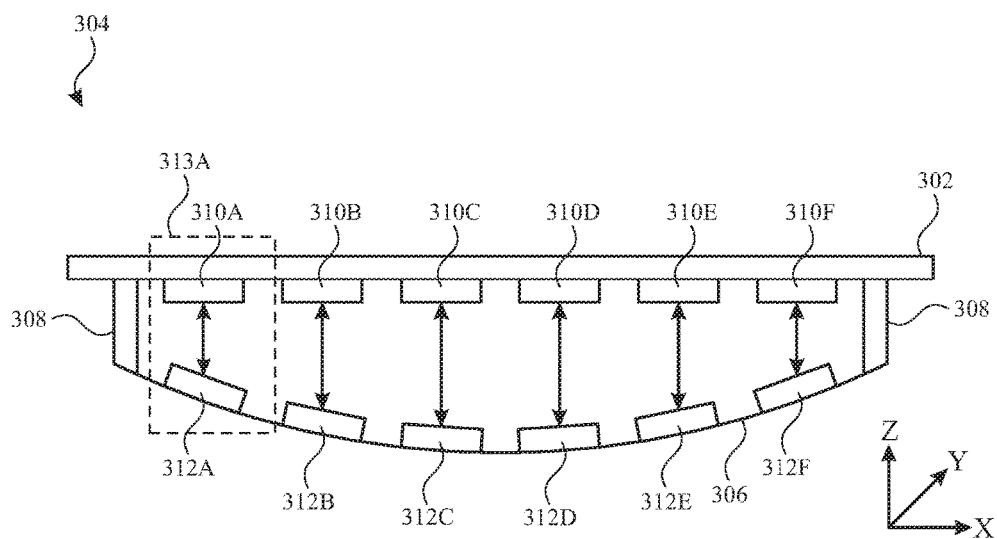
FIGS. 3A-3F illustrate an exemplary architecture for implementing force sensing in a touch screen according to examples of the disclosure.

FIGS. 3A-3F illustrate an exemplary architecture for implementing force sensing in a touch screen according to examples of the disclosure. FIG. 3A illustrates a cross section of a portion of the structure of force sensing touch screen 304 according to examples of the disclosure. Touch screen 304 can correspond to one or more of touch screens 124, 126, 128, 130 and 150 in FIGS. 1A-1E. Touch screen 304 can include cover glass 302, which can be the surface of the touch screen on which a user touches the touch screen (e.g., with a finger, stylus, or other object). Touch screen 304 can also include flex layer 306, which can be a flexible material anchored to cover glass 302 at anchors 308. Anchors 308 can affix the edges of flex layer 306 to cover glass 302, such that the edges of the flex layer can be substantially stationary, but the remaining portions of the flex layer can be substantially free to move toward and away from the cover glass. In some examples, flex layer 306 may not be anchored or affixed to cover glass 302—in such examples, the edges of the flex layer can be affixed to another structure that maintains the edges of the flex layer substantially stationary while leaving the remaining portions of the flex layer substantially free to move toward and away from the cover glass. In some examples, the flex layer may be laminated on a flexible metal foil substrate, and the substrate can be attached to cover glass 302 and anchors 308. The metal foil substrate can reduce or control the flexibility of flax layer 306, while still leaving flex layer 306 substantially free to move. Although referred to as a cover glass, more generally cover glass 302 can be a substrate formed from glass, sapphire crystal, plastic or any suitable material. Additionally, the cover glass 302 need not be representative of an external surface of the touch screen. For example, cover glass 302 can also represent display components (e.g., LCD layers and associated components, OLED layers and associated components, etc.) included in a touch screen device, which are not illustrated for simplicity.

Cover glass 302 can include or be coupled to a plurality of cover glass electrodes 310a-310f (referred to collectively as cover glass electrodes 310). Cover glass electrodes 310 can be electrically conductive elements (e.g., indium tin oxide (ITO), copper, etc.) that can be electrically isolated from one another. Similarly, flex layer 306 can include or be coupled to a plurality of flex layer electrodes 312a-312f (referred to collectively as flex layer electrodes 312) that can correspond to cover glass electrodes 310. For example, flex layer electrode 312a can correspond to cover glass electrode 310a, flex layer electrode 312b can correspond to cover glass electrode 310b, and so on. Flex layer electrodes 312 can also be electrically conductive elements (e.g., ITO, copper, etc.) that can be electrically isolated from one another. Pairs of corresponding cover glass electrodes 310 and flex layer electrodes 312 can form force sensors (e.g., capacitive gap or force sensors). For example, cover glass electrode 310a and corresponding flex layer electrode 312a can form force sensor 313a.

Touch screen 304 and/or the device in which the touch screen is integrated can be configured to detect changes in capacitance between corresponding pairs of cover glass electrodes 310 and flex layer electrodes 312. These changes in capacitance can be mapped to corresponding changes in distance (or gaps) between cover glass electrodes 310 and flex layer electrodes 312 and/or corresponding force values (e.g., newtons) of a touch on cover glass 302. In some examples, a table stored in memory, for example, can include a mapping of capacitance measurements to gap values. Such a table can be stored in the memory during the touch screen manufacturing or calibration processes. In some examples, a mathematical relationship between capacitance measurements and gap values can be used to determine gap values from the capacitance measurements. For example, if a user touches a location of cover glass 302 with sufficient force to cause the cover glass to deflect towards flex layer 306, touch screen 304 can detect a change in capacitance between the cover glass electrodes 310 and the flex layer electrodes 312 at that location (e.g., at the force sensor at that location), and can determine an amount of deflection of the cover glass and/or a corresponding amount of force of the touch. Because touch screen 304 can include a plurality of discrete force sensors, the touch screen can also determine a location of the force on cover glass 302.

Figure 3B:
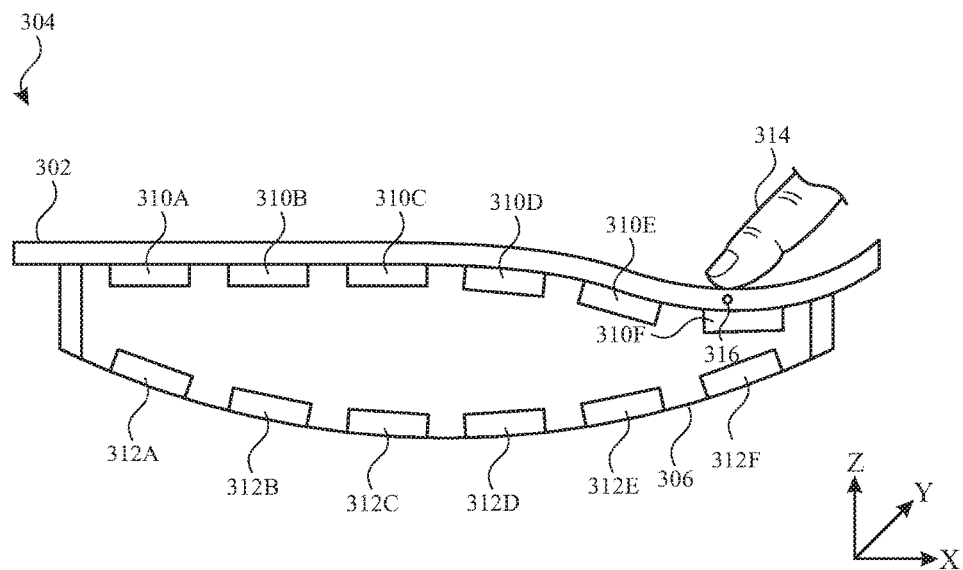

FIG. 3B illustrates finger 314 touching cover glass 302 at location 316 with sufficient force to deflect the cover glass according to examples of the disclosure. As a result of the deflection of cover glass 302 around location 316, cover glass electrodes 310d, 310e and 310f can be deflected towards flex layer 306 along the z-axis to varying degrees, and thus the distances (or gaps) between cover glass electrodes 310d, 310e and 310f and corresponding flex layer electrodes 312d, 312e and 312f can be reduced to varying degrees. Touch screen 304 can detect the changes in capacitance between the above pairs of cover glass electrodes 310 and flex layer electrodes 312 to determine the location of the deflection of cover glass 302, an amount of deflection of the cover glass, and/or an amount of force applied by finger 314 at location 316. In this way, touch screen 304 can use the above-described mechanism to detect force on cover glass 302.

Figure 3C:
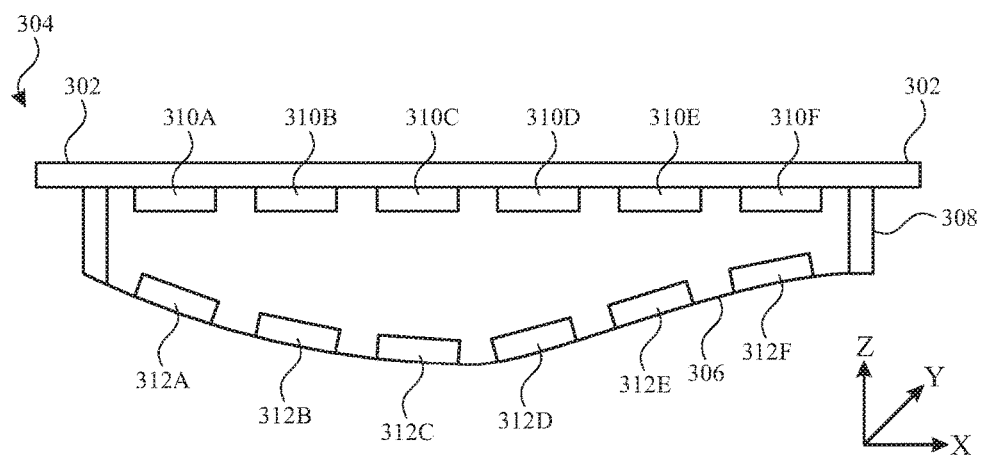

Because flex layer 306 can be substantially free to move except at its edges, as described above, the flex layer itself can deflect as a result of motion and/or changes in orientation of the device in which touch screen 304 is integrated (e.g., rotations of the device, translations of the device, changes in orientation of the device that can cause gravity to change its effect on the flex layer, etc.). FIG. 3C illustrates deflection of flex layer 306 resulting from motion of touch screen 304 according to examples of the disclosure. Due to inertial effects on flex layer 306 and/or flex layer electrodes 312, movement of touch screen 304 can result in movement of the flex layer. For example, a given movement of touch screen 304 can cause flex layer electrodes 312c, 312d, 312e and 312f to be deflected towards cover glass 302 along the z-axis, as illustrated. As described above, touch screen 304 can sense such deflections as changes in capacitance between the respective cover glass and flex layer electrodes. However, in the circumstance of FIG. 3C, these changes in capacitance sensed by the touch screen can be caused by motion of touch screen 304 rather than by deflection of cover glass 302 due to touch activity on the cover glass (e.g., as described with reference to FIG. 3B). As such, it may be beneficial to not ascribe such deflections to a force on cover glass 302. To accomplish this, touch screen 304 can utilize an inertial model that can estimate deflections of flex layer 306 due to motion or orientation of the touch screen (inertial contribution), and can utilize these estimates in its force sensing, as will be described in more detail below.

Figure 3D:
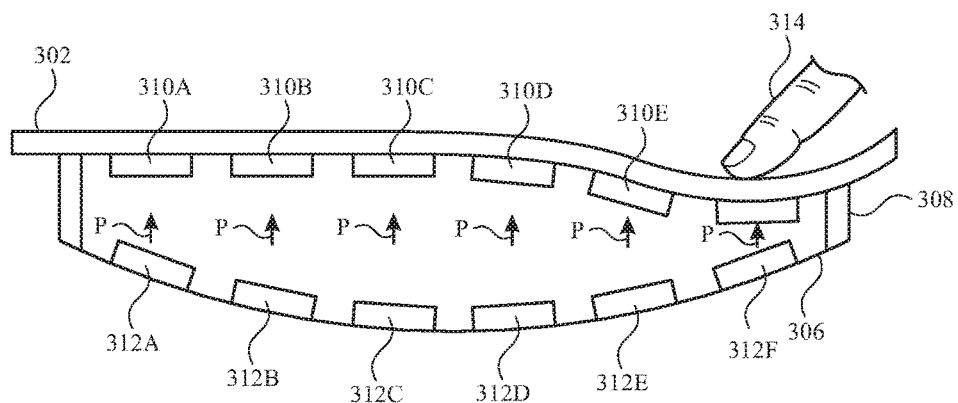

In some examples, the device in which the touch screen is integrated can be sealed such that forces applied to the surface of the touch screen can cause changes in internal pressure of the device. The changes in internal pressure can be transient changes until the internal pressure can reach equilibrium with external pressure. For example, the device may be sealed to prevent liquids, such as water, from entering and damaging the device (e.g., to make the device water proof or water resistant). The internal and external pressure can equalize via a membrane (e.g., a semi-permeable membrane configured to pass air but not water). The transient changes in pressure can affect the deflection of cover glass 302 and thereby the accuracy of force sensing. FIG. 3D illustrates deflection of flex layer 306 resulting from a finger 314 applying force to a surface of touch screen 304 of a sealed device according to examples of the disclosure. As described above with respect to FIG. 3B, the downward force of finger 314 applied to touch screen 304 can cause deflection of cover glass 302, which can be sensed as changes in capacitance between the respective cover glass and flex layer electrodes. However, for a sealed device, the force applied to touch screen 304 can result in an increased internal pressure, which can result in a force normal to the force applied by finger 314 (illustrated by arrows labeled "P"). In the circumstance of FIG. 3D, the changes in capacitance sensed by the force sensors caused by deflection of cover glass 302 due to touch activity on the cover glass (e.g., as described with reference to FIG. 3B) can be reduced due to the normal force caused by the increase in internal pressure. As such, it may be beneficial to determine the contribution of pressure to such deflections to a force on cover glass 302 (pressure contribution). To accomplish this, touch screen 304 can utilize a pressure model that can estimate changes in deflections of cover glass 302 due to internal pressure, and can utilize these estimates in its force sensing, as will be described in more detail below.

Figure 3E:
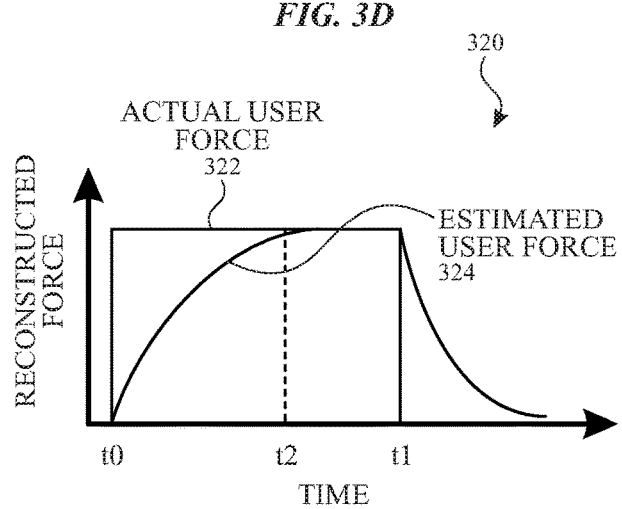

The effect of internal pressure on force sensor measurements can degrade the performance of the force-sensitive touch screen. FIG. 3E illustrates an exemplary force versus time plot 320 for a force-sensitive touch screen according to examples of the disclosure. Curve 322 can correspond to force applied to the surface of the force-sensitive touch screen by a user's finger, for example. As illustrated in FIG. 3E, the applied force of curve 322 can begin at t0 (touch down) and end at t1 (lift off). Although illustrated with vertical rising and falling edges, it should be understood that the user applied force can ramp up or down (with a slope) in practice. Curve 324 can correspond to the reconstructed force based on capacitive-gap sensor measurements without pressure compensation. The increased internal pressure due to the user applied force can create a normal force that can counteract the user applied force, though the pressure-induced normal force can decrease as the internal pressure equalizes with external pressure. For example, at touchdown at t0 the normal force can be greatest and as a result the reconstructed force at t0 can have its largest error with respect to the actual applied force. At t2 (e.g., when internal pressure reaches equilibrium with external pressure), the normal force can be zero and as a result the reconstructed force at t2 (and continuing to liftoff at t1) can match the actual applied force. The reduced deflection of cover glass 302 due to pressure-induced normal force can cause errors in reconstructed force, which can result in delayed force detection and/or an inconsistent user experience. As described herein in more detail below, pressure compensation can be implemented to reduce the effects of transient internal pressure changes. As illustrated in FIG. 3E, reducing the user applied force of the finger can also result in a change in internal pressure of the device which can impact the accuracy of force measurements, though the corresponding change in deflection may be in the opposite direction to the touch down case.

Figure 3F:
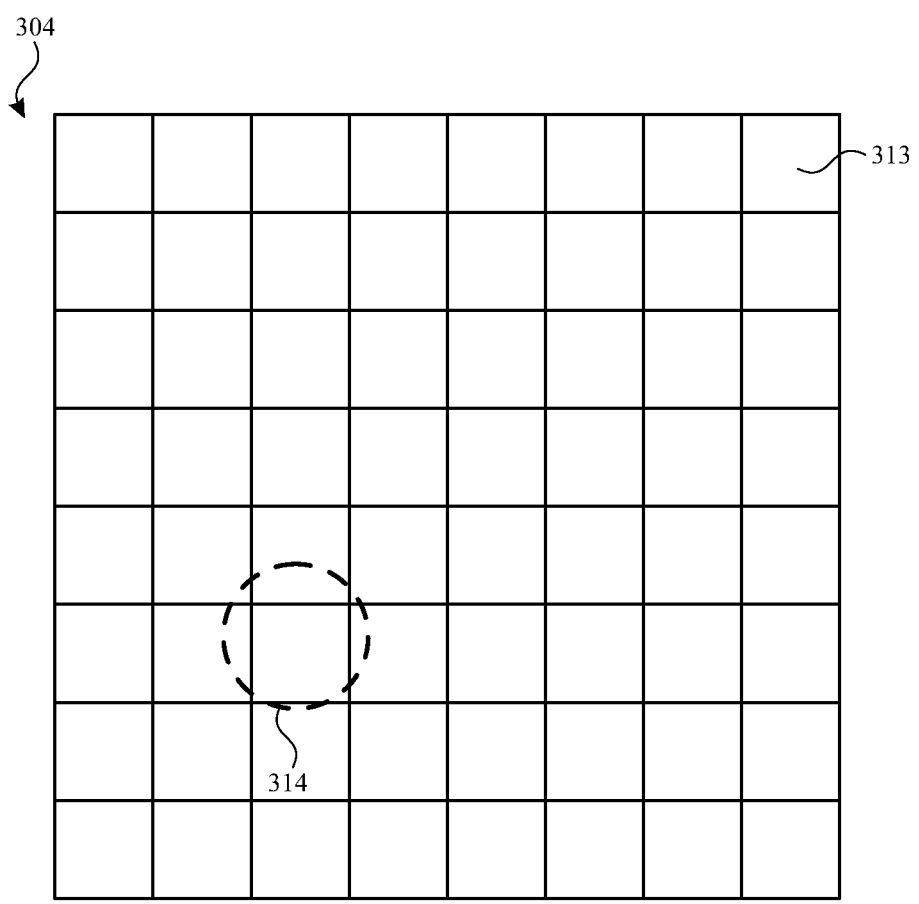

In some examples, touch screen 304 can include a two-dimensional array of force sensors that may be able to detect force at various locations on the touch screen. FIG. 3F illustrates an exemplary two-dimensional arrangement of force sensors 313 on touch screen 304 according to examples of the disclosure. As described previously, force sensors 313 can comprise cover glass electrode-flex layer electrode pairs. In the illustrated example, touch screen 304 can include an eight-by-eight arrangement of force sensors 313, though other two-dimensional arrangements of force sensors are also within the scope of the disclosure. As described above, in some circumstances, a finger or other object 314 can touch the cover glass (not illustrated) with sufficient force to deflect the cover glass, and touch screen 304 can detect the location, deflection and/or force corresponding to the touch at various locations on the touch screen. In some examples, touch screen 304 can also detect the location, deflection and/or force of multiple fingers or objects touching the touch screen concurrently.

Figure 4A:
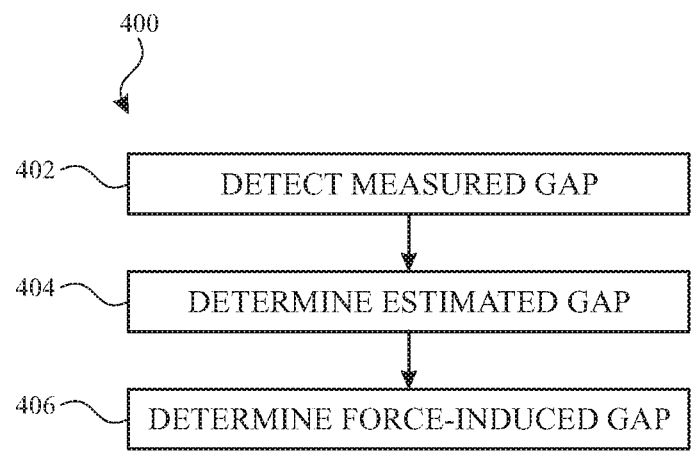
FIG. 4A illustrates an exemplary process for compensating for changes in flex layer position in force sensing according to examples of the disclosure.

As discussed above, the touch screen of the disclosure may be configured to compensate for or ignore changes in distance between the cover glass and the flex layer caused by movement of the flex layer (e.g., due to movement of the touch screen or changes in orientation of the touch screen), while retaining those portions of the changes in distance resulting from deflection of the cover glass (e.g., due to a touch on the cover glass). FIG. 4A illustrates an exemplary process 400 for compensating for changes in flex layer position in force sensing according to examples of the disclosure. At 402, the gap along the z-axis (as illustrated in FIGS. 3A-3C) between cover glass electrodes and flex layer electrodes (e.g., electrodes 310 and 312 in FIGS. 3A-3C) can be detected. Such detection can be accomplished by detecting the capacitance between the cover glass electrodes and the flex layer electrodes, as previously described.

At 404, an estimated gap along the z-axis (as illustrated in FIGS. 3A-3C) between the cover glass electrodes and the flex layer electrodes can be determined. This estimated gap can correspond to the expected gap between the cover glass electrodes and the flex layer electrodes resulting from an expected position of the flex layer based on an orientation and/or motion of the touch screen. In other words, the estimated gap can estimate the force sensor gaps caused, not by touches on the cover glass, but rather by acceleration experienced by the touch screen (e.g., gravity and/or other acceleration), as illustrated in FIG. 3C. Any suitable model can be utilized to estimate the positions of the flex layer electrodes (and thus, the corresponding gaps of the force sensors) as a function of motion and/or orientation of the touch screen. The details of an exemplary dynamic inertial model for estimating such gaps will be described with reference to FIG. 4B, below.

At 406, the estimated gap from 404 can be used to compensate the measured gap from 402 to determine a force-induced gap (e.g., gaps or changes in gaps due to force on the cover glass, rather than motion or orientation of the touch screen). In other words, the measured gap from 402 can include total changes in gaps resulting from force on the cover glass (if any) and changes in the position of the flex layer (if any). Estimated gap from 404 can estimate substantially only changes in gaps resulting from changes in the position of the flex layer (if any). At 406, the estimated changes in gaps resulting from changes in the position of the flex layer (from 404) can be removed from the total measured changes in gaps (from 402) to produce changes in gaps due substantially only to force on the cover glass. In some examples, the arithmetic difference (i.e., subtraction) between the measured gaps (from 402) and the estimated gaps (from 404) can correspond to the changes in gaps due to force on the cover glass.

Figure 4B:
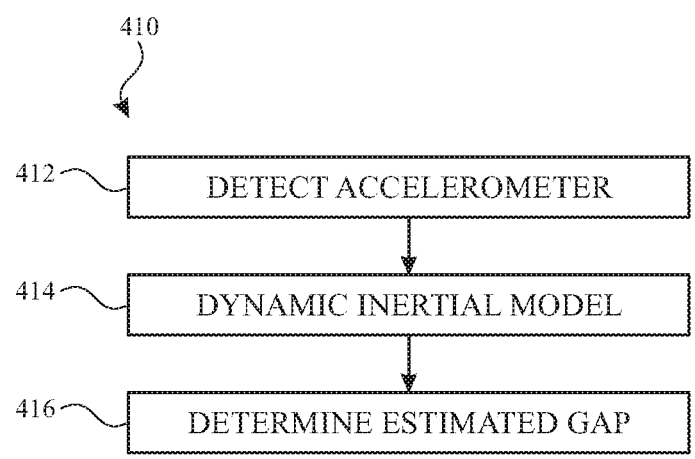
FIG. 4B illustrates an exemplary process for determining estimated gaps for force sensors using a dynamic inertial model according to examples of the disclosure.

FIG. 4B illustrates an exemplary process 410 for determining estimated gaps for force sensors using a dynamic inertial model according to examples of the disclosure. Process 310 in FIG. 4B can correspond to step 404 in FIG. 4A. In FIG. 4B, at 412, accelerometer data reflecting motion and/or orientation of the touch screen can be detected. In some examples, the accelerometer data can be gathered from an accelerometer (e.g., motion and/or orientation device 224) included in a device in which the touch screen is integrated, which can detect quantities such as the motion and/or orientation of the device (and thus the touch screen). However, it is understood that the accelerometer data can be detected or received from any number of sources, including from sources external to the device that can determine the acceleration experienced by the device and/or its orientation.

At 414, the accelerometer data detected at 412 can be utilized by a dynamic inertial model to determine estimated force sensor gaps at 416. In particular, the dynamic inertial model can be a model that, given the acceleration under which the device (and thus the touch screen, and in particular, the flex layer) is operating, estimates the resulting positions of the flex layer electrodes in the touch screen. In some examples, the dynamic inertial model can be based on modeling each flex layer electrode (e.g., flex layer electrodes 312 in FIGS. 3A-3C) as a mass coupled to a fixed position via a spring and a damper, in parallel (i.e., a spring-mass-damper model), though other dynamic models could similarly be used. For example, a second-order model can be utilized to model the dynamics of each flex layer electrode, which, in the frequency domain (i.e., z-domain) can be expressed as:

$$\frac{Y(z)}{A(z)} = H(z) = \frac{\alpha_0 + \alpha_1 z^{-1} + \alpha_2 z^{-2}}{1 + \beta_1 z^{-1} + \beta_2 z^{-2}} \quad (1)$$

where $Y(z)$ can correspond to the estimated gap for a given force sensor, $A(z)$ can correspond to the acceleration (in some examples, the component of the acceleration along the z-axis illustrated in FIGS. 3A-3C) detected by the accelerometer at 412, and $\alpha_0$, $\alpha_1$, $\alpha_2$, $\mu_1$ and $\beta_2$ can correspond to coefficients that determine the modeled dynamics of the flex layer electrodes. In the discrete-time domain, the second-order model of equation (1) can be expressed as:

$$y_n = \alpha_0 a_n + \alpha_1 a_{n-1} + \alpha_2 a_{n-2} - \beta_1 y_{n-1} - \beta_2 y_{n-2} \quad (2)$$

where $y_n$ can correspond to the estimated gap for a given force sensor at time step n (e.g., at the n-th acceleration and/or gap sample period of the touch screen), $a_n$ can correspond to the acceleration (in some examples, the component of the acceleration along the z-axis illustrated in FIGS. 3A-3C) detected by the accelerometer at 412 at time step n (e.g., at the n-th acceleration and/or gap sample period of the touch screen), and, as above, $\alpha_0$, $\alpha_1$, $\alpha_2$, $\beta_1$ and $\beta_2$ can correspond to coefficients that determine the modeled dynamics of the flex layer electrodes.

Using equations (1) and/or (2) above, the touch screen of the disclosure can model the expected behavior of the flex layer electrodes under the acceleration experienced by the touch screen, and thus can determine the estimated gaps for each force sensor at 416.

In some examples, the dynamic inertial model used to determine the estimated gaps for the force sensors can be calibrated when the touch screen is manufactured. Thus, the dynamic inertial model (and the associated coefficients $\alpha_0$, $\alpha_1$, $\alpha_2$, $\beta_1$ and $\beta_2$) can relatively accurately model the behavior of the flex layer based on the properties of the flex layer at the time of calibration. However, the physical properties of the flex layer can change over time. For example, if the touch screen is dropped and impacts an object, the flex layer may be damaged, which may, in turn, change the behavior of the flex layer in a way that deviates from the expected behavior of the flex layer provided by the stored coefficients of the dynamic inertial model. Environmental factors, such as ambient temperature or ambient pressure changes, may also affect the behavior of the flex layer. As such, it may be beneficial for the device to recalibrate the dynamic inertial model over time to maintain accuracy in force sensing. In some examples, such learning can be accomplished by determining updated coefficients $\alpha_0$, $\alpha_1$, $\alpha_2$, $\beta_1$ and $\beta_2$ for use in equations (1) and/or (2), above.

Figure 4C:
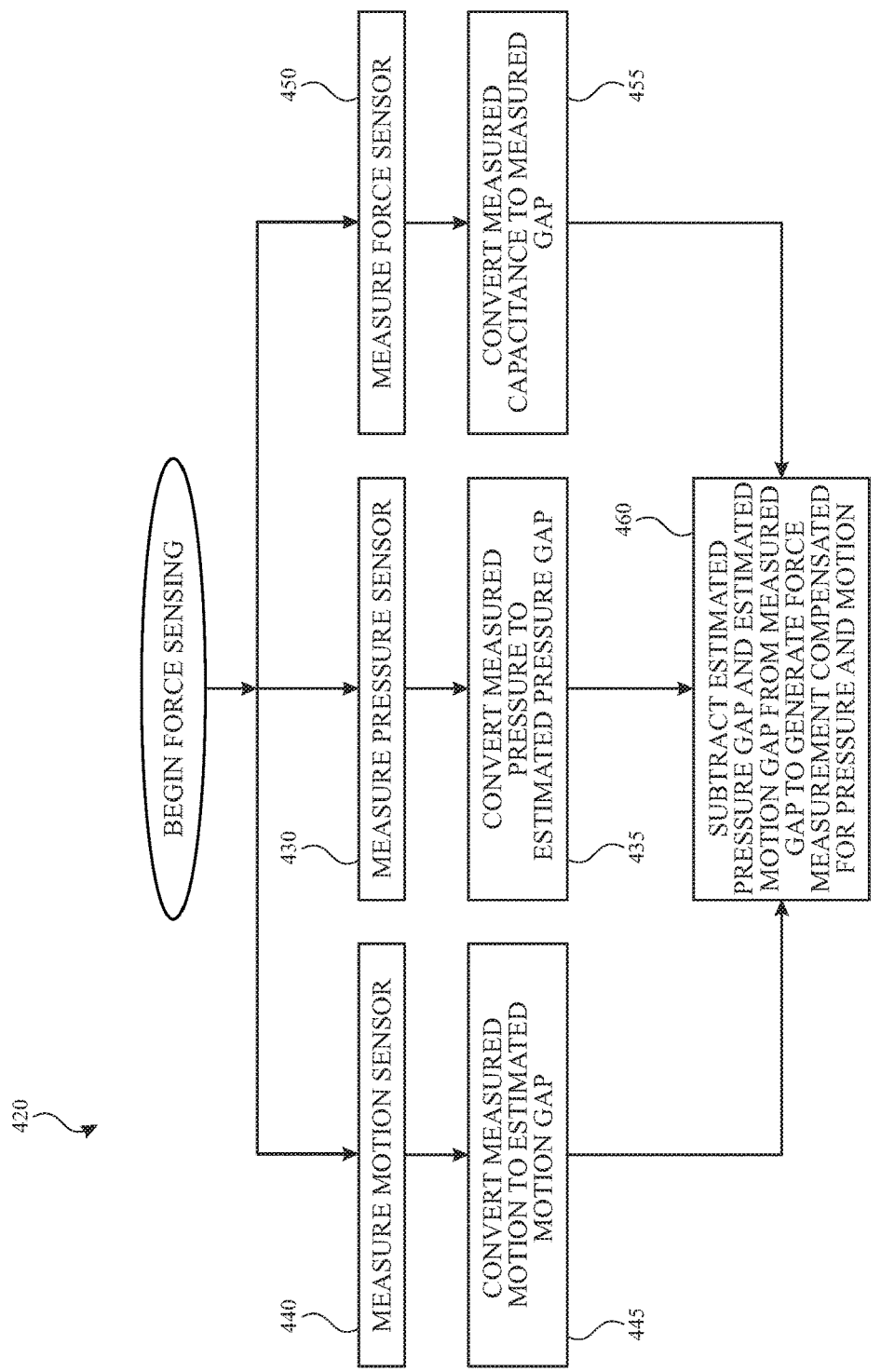
FIG. 4C illustrates an exemplary process for force sensing including pressure compensation according to examples of the disclosure.

As discussed herein, internal pressure changes can counteract deflection of the cover glass from a pressing finger and thereby introduce errors in force sensing. FIG. 4C illustrates an exemplary process 420 for force sensing including pressure compensation according to examples of the disclosure. At 430, the system (e.g., force controller 214) can measure pressure from pressure sensor 222. Additionally, the system (e.g., force controller 214 and/or pressure sensor 222) can track a baseline pressure so that a change in internal pressure of the device can be detected. At 435, the system can estimate a change in the gap measurement due to pressure changes (e.g., a pressure contribution). As described in more detail below, a force sensor panel can be characterized to determine the pressure contribution for various pressure changes (also referred to herein as pressure compliance). Estimating a pressure contribution can include multiplying the measured change in pressure with a pressure compliance parameter. At 440, the system (e.g., force controller 214) can measure motion from a motion/orientation sensor 224 (e.g., an accelerometer, gyroscope, etc.). At 445, the system can estimate a change in gap due to motion (e.g., a motion contribution). The estimated change in gap due to motion can be generated based on the dynamic inertial model as discussed above. At 450, the system (e.g., force controller 214) can measure the force sensor panel (e.g., measure changes in mutual capacitance between electrodes of force sensors due to deflections of the cover glass and/or flex layer). The capacitance measurements for corresponding force sensors can be converted into gap measurements at 455. At 460, the pressure contribution and motion contribution can be subtracted from the measured gaps to generate gap measurements corresponding to the finger(s) contribution (e.g., due to user applied force).

In some examples, measuring or sampling the motion sensor (at 440), pressure sensor (at 430) and force sensor(s) (at 450) can occur partially or fully simultaneously and at the same rate. For example, the sampling rate for each of the three can be 60 Hz, for example. In some examples, the sampling rate of one or more measurements can be different. For example, the force sensor and motion sensor may be sampled at a first rate (e.g., 60 Hz) and the pressure sensor may be sampled at a second rate (e.g., 20 Hz). In some examples, the sampling rate can change depending on various conditions. For example, the pressure sensor, force sensor and/or motion sensor sampling rate can increase from a respective first sampling rate to a second sampling rate when a touch is detected by the touch sensor panel.

Although described herein primarily in terms of capacitive-gap sensors, it should be understood that the pressure compensation described herein can be applied to force measurements from other force sensors affected by pressure effects (e.g., in which internal pressure changes the properties of the sensor in an undesirable manner). Additionally, although described herein primarily in terms of removing pressure contributions in the gap domain, it should be understood that the pressure contribution can alternatively be removed in the force domain or any other suitable domain.

Figure 5:
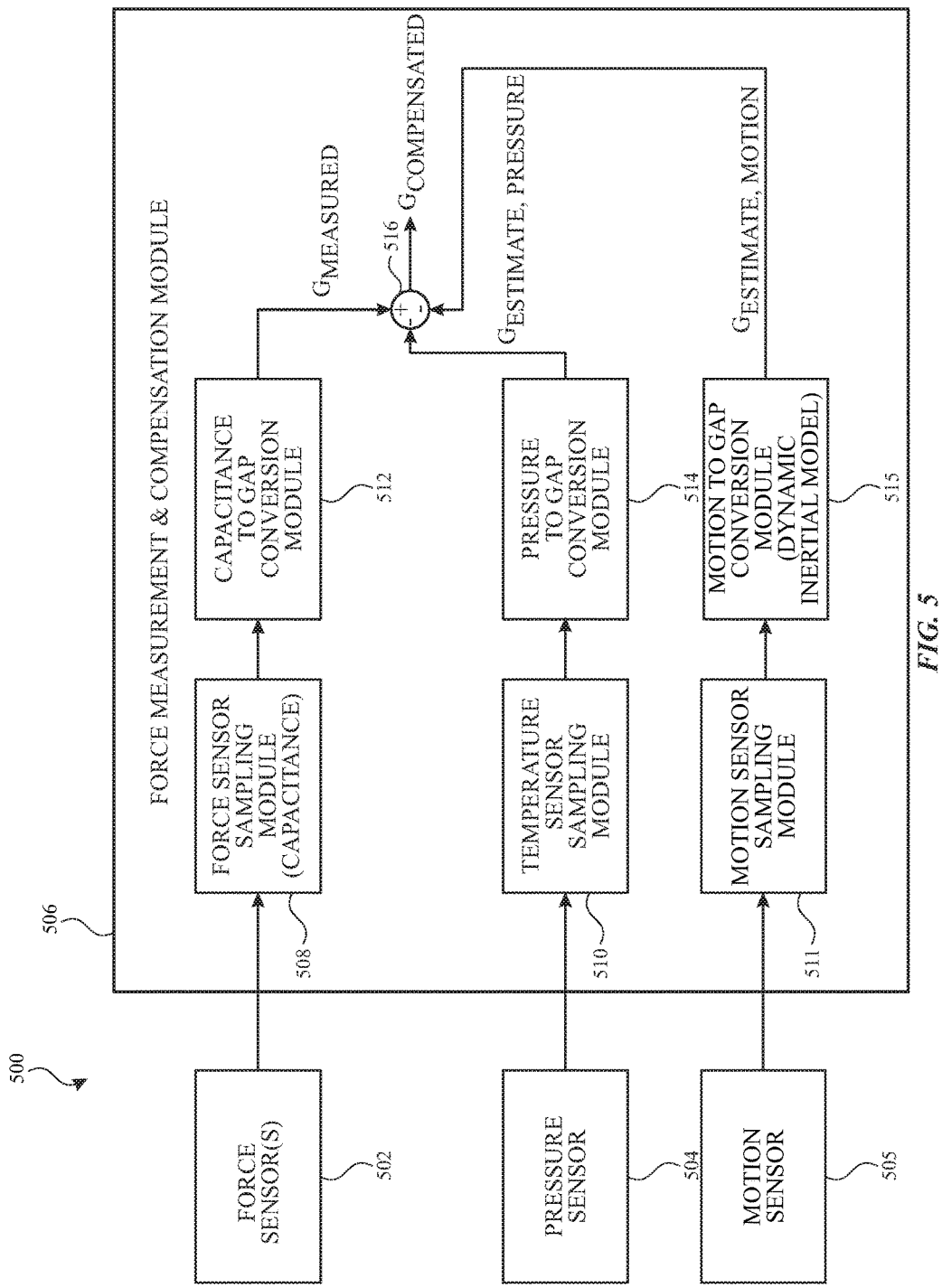
FIG. 5 illustrates an exemplary block diagram for pressure compensation according to examples of the disclosure.

FIG. 5 illustrates an exemplary block diagram for pressure compensation according to examples of the disclosure. Block diagram 500 includes force sensors 502 (e.g., corresponding to force sensor panel 210), a pressure sensor 504 (e.g., corresponding to pressure sensor 222), motion sensor 505 (e.g., corresponding to motion and/or orientation sensor 224) and a force measurement and compensation module 506 (e.g., corresponding to force controller 214). The force measurement and compensation module 506 can include hardware, software, firmware or a combination thereof configured to measure force and compensate force measurements for pressure effects. Force sensors 502 can be sampled by force sensor sampling module 508 (e.g., receive circuitry) of force measurement and compensation module 506. For example, the sampling can be a measurement of the mutual capacitance formed between the cover glass electrodes and flex layer electrodes of the force sensor panel (or a change in mutual capacitance therebetween). The mutual capacitance (or change in mutual capacitance) can be converted into a gap measurement by capacitance-to-gap conversion module 512. Pressure sensor 504 can be sampled by pressure sensor sampling module 510 of force measurement and compensation module 506. The sampled pressure (or change in pressure) can be converted into a gap estimate (e.g., pressure contribution) by pressure-to-gap conversion module 514. In some examples, a baseline pressure measurement can be tracked so that transient changes in pressure can be better detected, and the associated pressure contribution to force sensor measurements can be better compensated. In such examples, the pressure measured at pressure sensor 504 can be baselined to subtract the baseline pressure when determining changes in internal pressure of the device. Adder/Subtractor 516 can remove the estimated pressure gap contribution from the measured gap to extract pressure contribution. Motion sensor 505 can be sampled by motion sensor sampling module 511 of force measurement and compensation module 506. The sampled motion (or change in motion) can be converted into a gap estimate (e.g., motion contribution) by motion-to-gap conversion module 515. In some examples, a baseline motion measurement can be tracked so that transient changes in motion can be better detected, and the associated motion contribution to force sensor measurements can be better compensated. In such examples, the motion measured at motion sensor 505 can be baselined to subtract the baseline motion when determining changes in motion of the device. Adder/Subtractor 516 can remove the estimated motion gap contribution from the measured gap to extract the motion contribution. The compensated gap output by adder/subtractor 516 can represent the gap contribution attributable to actual force with the pressure contribution and the motion contribution removed (or reduced). The amount of force applied to the sensor can be determined based on the compensated gap.

It should be understood that the baseline gap or capacitance (e.g., steady-state without an object touching the force-sensitive touch screen) can be removed from the measured gap at different stages in the above block diagram. In some examples, the baseline gap can be removed from the compensated gap, or by capacitance-to-gap conversion module 512 or add/subtractor 516. In some examples, the baseline capacitance can be removed from the measured capacitance before conversion from capacitance-to-gap by capacitance-to-gap conversion module 512, or by force sensor sampling module 508.

As discussed above, the pressure contribution can be removed from gap measurements based on internal pressure measurements (e.g., by pressure-to-gap conversion module 514). The conversion between pressure measurements and the pressure contribution can be based on a characterization of pressure effects on touch screen deflection (gap changes). For example, a force-sensitive touch screen under calibration can be characterized based on known force inputs. The internal pressure can be measured by the pressure sensor and the corresponding gap measurement can be measured. For example, referring back to FIG. 3E, an initial gap measurement ($G_{initial}$) and corresponding pressure measurement ($P_{initial}$) can be taken at or shortly after applying a force to the touch screen (e.g., at or shortly after t0) and a second gap measurement ($G_{final}$) and corresponding pressure measurement ($P_{final}$) can be taken once the internal pressure equalizes (e.g., at or after t2). The difference between the gap measurements and pressure at the two measurement points can be used to generate a conversion parameter representative of the pressure compliance of the touch screen. For example, the pressure compliance can be expressed mathematically by equation (3):

$$\text{Pressure Compliance} = \frac{\Delta G}{\Delta P} = \frac{G_{final} - G_{initial}}{P_{final} - P_{initial}} \quad (3)$$

In some examples, the pressure compliance can be characterized using more than two measurements of the gap and pressure. For example, equation (3) can be generalized to a linear (nor non-linear) fit of N pressure and gap data points. During operation, the pressure calibration data can be used to remove the pressure component from the gap measurements. For example, the pressure sensor can be sampled to measure pressure changes, a gap change (e.g., deflection) due to pressure change can be estimated (e.g., by multiplying the pressure change by the pressure calibration data) and the deflection contribution from pressure changes can be removed from the gap measurements.

Figure 6A:
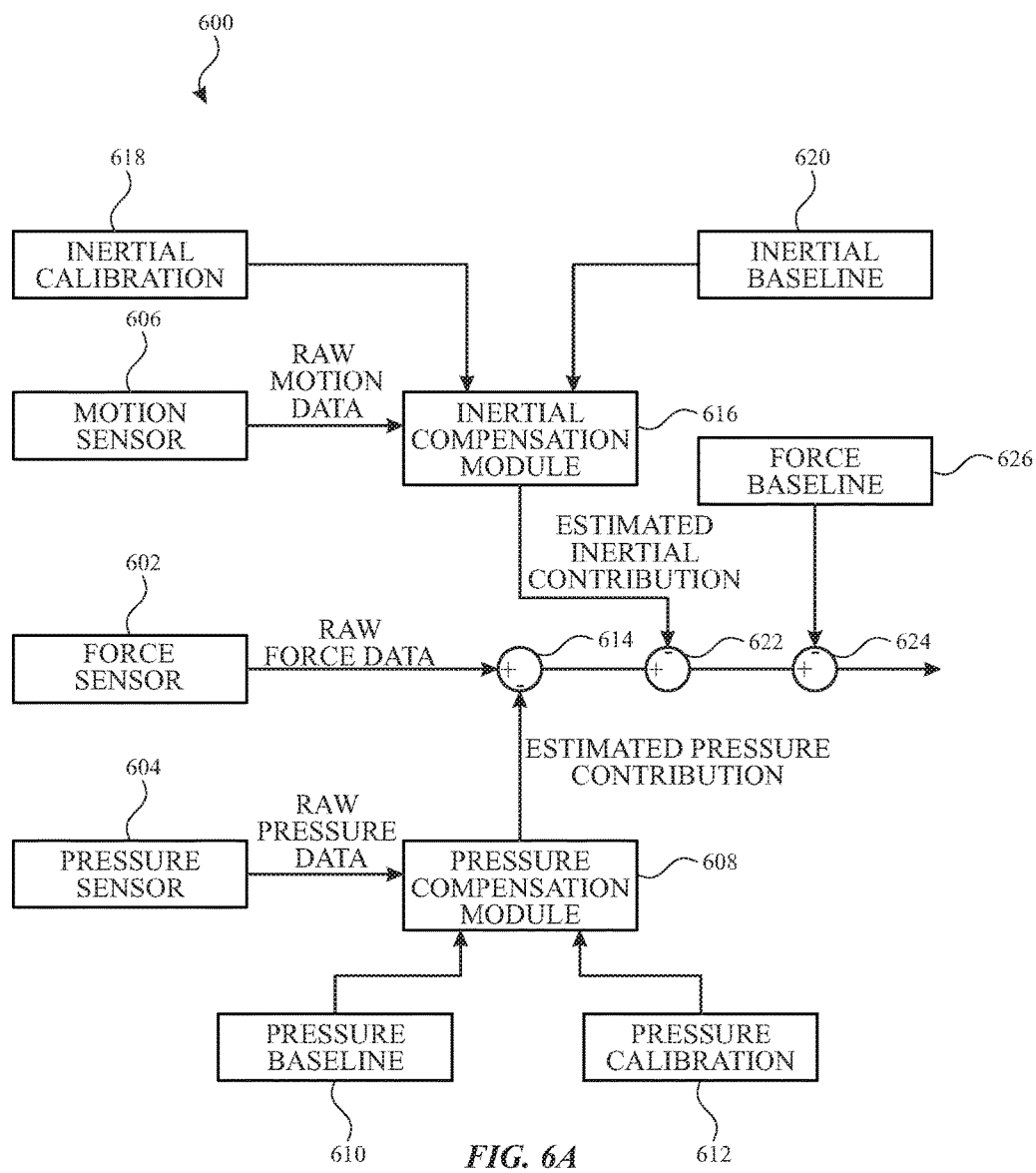
FIG. 6A illustrates an exemplary flow chart for force sensing including baselining according to examples of the disclosure.

In some examples, force sensing can include baselining. FIG. 6A illustrates an exemplary flow chart for force sensing including baselining according to examples of the disclosure. As described herein, the force sensor(s) 602, pressure sensor 604 and motion sensor 606 (e.g., corresponding to force sensor(s) 502, pressure sensor 504 and motion sensor 506) can be sampled to generate raw force sensor data, raw pressure sensor data and raw motion sensor data, respectively. Raw force sensor data can be mutual capacitance measurements (e.g., one measurement per force sensor) corresponding to the gap between electrodes of respective force sensors. Although not shown, the raw force sensor data can be converted to a gap measurement as discussed herein. Raw pressure sensor data can be measurements of internal pressure of the device (e.g., corresponding to the pressure in the cavity between the cover glass and flex layer). Raw motion data can include three dimensional acceleration measurements, for example. In some examples, the raw motion data can include acceleration measurements in one direction (perpendicular to the cover glass).

Pressure compensation module 608 can generate an estimated pressure contribution to the gap (deflection) of the force sensors, and the estimated pressure contribution can be removed from the raw force data (e.g., at adder/subtractor 614). Pressure compensation module 608 can generate the estimated pressure contribution based on raw pressure data from pressure sensor 604, pressure baseline data 610 and pressure calibration data 612 (pressure compliance data). Raw pressure data, as discussed above, can be an internal pressure measurement (e.g., measured in Pascals). As discussed herein, the estimated pressure contribution can be calculated based on a change in pressure relative to a baseline pressure (e.g., by subtracting the baseline pressure from the raw pressure measurement). The baseline pressure can be tracked and updated during operation. In some examples, the pressure can be sampled and the baseline updated periodically (e.g., once a second, once an hour) or in response to a triggering event (e.g., after a threshold altitude change, after a threshold motion, after powering the display off). In some examples, when a touch event is detected by the system (e.g., touch controller 212), the baseline pressure inside the device can be updated. In some examples, the baseline may be maintained or updated by low pass filtering the pressure signal (e.g., to account for rapid sequential taps). The low pass filtering of the pressure signal (e.g., a history of a number of pressure measurements) can minimize the effect of outlier transient pressure changes). The baseline can be stored, for example, in a register or memory in the system.

After baselining the pressure measurement to determine a change in pressure compared with the baseline, the change in pressure can be converted into an estimated pressure contribution based on the pressure compliance. The pressure compliance can be stored in memory, for example. In some examples, the estimated pressure contribution can be generated by multiplying the baselined pressure measurement by the compliance parameter. In some examples, the estimated pressure contribution can be supplied by a look-up table (LUT) based on the baselined pressure measurement input.

Inertial compensation module 616 can generate an estimated inertial contribution to the gap (deflection) of the force sensors, and the estimated inertial contribution can be removed from the pressure-compensated force data (e.g., at adder/subtractor 622). Inertial compensation module 616 can generate the estimated inertial contribution based on raw motion data from motion sensor 606, inertial baseline data 620 and inertial calibration data 618 (inertial compliance data). Raw motion data can, for example, be measurements from an accelerometer (e.g., measured in m/s$^2$). As discussed herein, the estimated inertial contribution can calculated based on a change in motion relative to an inertial baseline (e.g., subtracting the inertial baseline from the raw inertial measurement). The inertial baseline can be tracked and updated during operation. In some examples, the motion can be sampled and the baseline updated continuously or periodically (e.g., once a second, once an hour) or in response to a triggering event (e.g., after powering the display on). After baselining the inertial measurement to determine a change in motion and/or orientation, the change in motion and/or orientation can be converted into an estimated inertial contribution based on the dynamic inertial model (e.g., stored in memory). In some examples, the estimated inertial contribution can be supplied by a look-up table (LUT) based on the baselined motion measurement input.

The pressure-compensated and inertial-compensated force data can be baselined as well. As discussed herein, a force sensor panel can have a baseline gap even when no force is applied to the force-sensitive touch screen. Force baseline 626 (e.g., stored in memory) can be subtracted from the pressure-compensated and inertial-compensated force data to generate a gap measurement indicative of the contribution from user-applied force.

Although FIG. 6A illustrates baselining schemes for pressure, motion and force, it should be understood that baselining schemes for any of the sensors can be omitted in some examples. Additionally, it should be understood that baselining can be performed at different stages than illustrated in FIG. 6A.

Figure 6B:
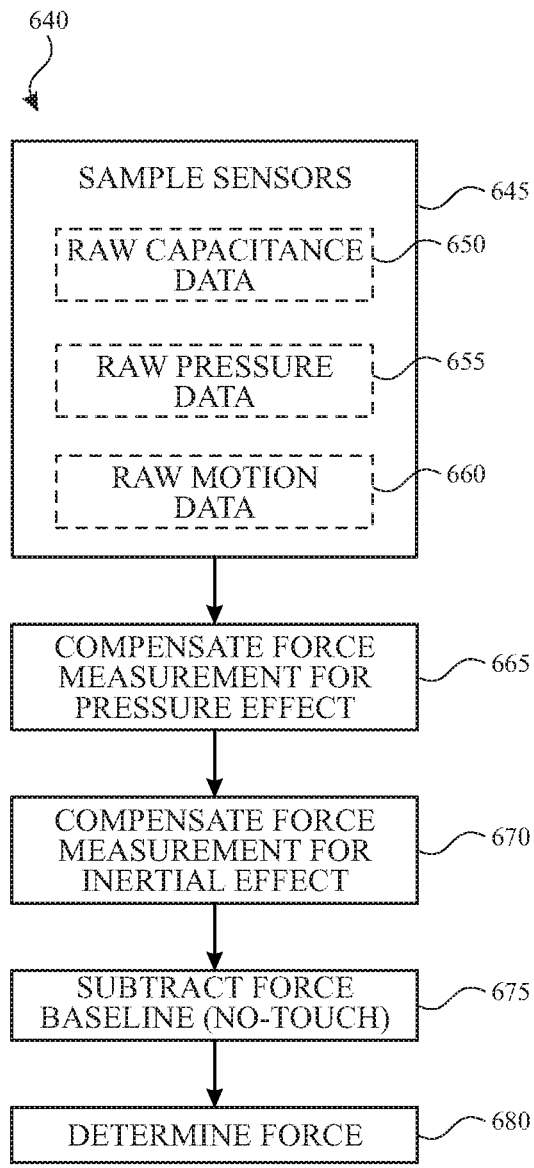
FIG. 6B illustrates an exemplary process for force sensing including baselining according to examples of the disclosure.

FIG. 6B illustrates an exemplary process 640 for force sensing including baselining according to examples of the disclosure. At 645, the system (e.g., force controller 214) can sample the various sensors. At 650, the force sensors can be sampled to measure raw capacitance data (e.g., indicative of the separation between cover glass electrodes and flex layer electrodes). At 655, the pressure sensor can be sampled to measure raw pressure data (e.g., indicative of the internal pressure of a device). At 660, the motion and/or orientation sensor can be sampled to measure the raw motion data (e.g., indicative of the motion and/or orientation of the device). In some examples, these sensors can be sampled at the same rate (e.g., all at 60 Hz) or at different rates (e.g., force sensors sampled at 60 Hz, accelerometer sampled at 120 Hz and pressure sensor sampled at 30 Hz). The force measurements can be compensated for pressure effects at 665 (e.g., as described with reference to FIGS. 5 and 6A). The pressure compensation can include pressure baselining. The force measurements can be compensated for inertial effects at 670 (e.g., as described with reference to FIGS. 5 and 6A). The inertial compensation can include inertial baselining. The force measurements can be baselined at 675 (e.g., as described with reference to FIG. 6A) to remove the contribution of the gap independent of user applied force (e.g., the gap when no touch is detected). At 680, the system can determine the user applied force based on the force measurement (gap measurement) after pressure compensation, inertial compensation and force baselining.

In some examples, pressure compensation can be enabled/disabled under certain conditions. For example, the pressure compensation can be enabled when an object is detected at the surface of the touch screen (e.g., by touch controller 212) and disabled when an object is not detected at the surface of the touch screen. Additionally, in some examples, force sensing of the force-sensitive touch screen can also be disabled when no object is detected on the surface. In other examples, force sensing of the force-sensitive touch screen can be enabled even when no object is detected to avoid lag in detecting force. In some examples, pressure compensation can be disabled when the device detects that the internal pressure is equalizing without delay (e.g., due to damage to the seal of the device). In some examples, pressure compensation can be disabled in a low power state (e.g., when battery charge for a device including the force-sensitive touch screen is below a threshold). In some examples, pressure compensation can be disabled after a threshold period of time after detecting the object without liftoff. It should be understood that these conditions are exemplary and other conditions can exist to enable or disable pressure compensation. It should further be understood that various combinations of the above conditions can be used. It should be understood that when pressure compensation is disabled, force sensing operations can continue (e.g., using force measurements and inertial compensation). The amount of force can be determined from the inertial compensated gap measurement (rather than the pressure and inertial compensated gap).

Although described herein primarily in terms of capacitive-gap sensors, it should be understood that the pressure compensation described herein can be applied to force measurements from other force sensors (e.g., capacitive, strain gauge, piezoelectric, piezoresistive, ultrasonic, magnetic, etc.) affected by pressure effects described herein (e.g., in which a pressure component changes the properties of the sensor in an undesirable manner).

Thus, the examples of the disclosure provide various ways to maintain the accuracy of force sensing on a device by using pressure compensation.

Therefore, according to the above, some examples of the disclosure are directed to an electronic device. The electronic device can comprise: a force-sensitive surface comprising: one or more force sensors configured to measure an amount of force applied to the force-sensitive surface; and a pressure sensor coupled proximate to the one or more force sensors and configured to measure an internal pressure of the electronic device associated with the one or more force sensors; and one or more processors coupled to the one or more force sensors and capable of: compensating the amount of force measured by the one or more force sensors based on the internal pressure associated with the one or more force sensors. Additionally or alternatively, in some examples, the one or more force sensors are capacitive force sensors can include one or more first electrodes and one or more second electrodes. A change in a gap between the one or more first electrodes and the one or more second electrodes due to the amount of applied force can change a capacitance formed between the one or more first electrodes and the one or more second electrodes. Additionally or alternatively, in some examples, the force-sensitive surface can further comprise one or more touch sensors configured to detect an object touching the surface; and the one or more processors can be capable of compensating the amount of force in response to detecting the object touching the surface. Additionally or alternatively, in some examples, in response to detecting the object touching the surface, an internal pressure baseline can be updated. Additionally or alternatively, in some examples, compensating the amount of force measured by the one or more force sensors based on the pressure associated with the one or more force sensors can comprise: determining a measured gap based on a capacitance formed between one or more first electrodes and one or more second electrodes of the one or more force sensors; determining an estimated gap associated with a pressure change introduced into the electronic device by the object touching the surface based on the pressure associated with the one or more force sensors; determining a pressure compensated gap by subtracting the estimated gap associated with the pressure change from the measured gap. Additionally or alternatively, in some examples, compensating the amount of force measured by the one or more force sensors based on the pressure associated with the one or more force sensors can comprise: determining the compensated amount of force based on the pressure compensated gap. Additionally or alternatively, in some examples, the one or more processors can be further capable of tracking a baseline internal pressure. Determining the estimated gap associated with the pressure change can comprise subtracting the baseline internal pressure from the internal pressure measured by the pressure sensor to determine the pressure change. Additionally or alternatively, in some examples, the electronic device can further comprise: a motion sensor configured to measure motion of the electronic device. The one or more processors can be capable of: determining an estimated gap associated with a motion change introduced into the electronic device by movement of the electronic device based on the measured motion of the electronic device; determining a pressure and motion compensated gap by subtracting the estimated gap associated with the motion change from the pressure compensated gap; and determining the compensated amount of force based on the pressure and motion compensated gap. Additionally or alternatively, in some examples, the estimated gap associated with the pressure change can be determined by applying a pressure compliance parameter to the pressure change.

Some examples of the disclosure are directed to a method. The method can comprise: measuring, with a force sensor, an amount of force applied to a force-sensitive surface; measuring a pressure associated with the force sensor; and compensating the amount of force measured by the force sensor based on the pressure associated with the force sensor. Additionally or alternatively, in some examples, the method can further comprise: tracking a baseline pressure associated with the force sensor; and determining a change in pressure associated with the force sensor by subtracting the baseline pressure from the measured pressure. Compensating the amount of force measured by the force sensor can be based on the change in pressure associated with the force sensor. Additionally or alternatively, in some examples, compensating the amount of force measured by the force sensor based on the pressure associated with the force sensor can comprise: determining a measured gap based on a capacitance formed between one or more first electrodes and one or more second electrodes of the force sensor; determining an estimated gap associated with a pressure change introduced into the electronic device by the object touching the surface based on the pressure associated with the force sensor; determining a pressure compensated gap by subtracting the estimated gap associated with the pressure change from the measured gap. Additionally or alternatively, in some examples, compensating the amount of force measured by the force sensor based on the pressure associated with the force sensor can comprise: determining the compensated amount of force based on the pressure compensated gap. Additionally or alternatively, in some examples, the method further can comprise: determining an estimated gap associated with a motion change associated with the force sensor; determining a pressure and motion compensated gap by subtracting the estimated gap associated with the motion change from the pressure compensated gap; and determining the compensated amount of force based on the pressure and motion compensated gap. Additionally or alternatively, in some examples, the estimated gap associated with the pressure change can be determined by applying a pressure compliance parameter to the pressure change.

Some examples of the disclosure are directed to a non-transitory computer readable storage medium. The non-transitory computer readable storage medium can store instructions, which when executed by one or more processors, can cause the one or more processors to perform a method for compensating force measurements, the method comprising: measuring, with a force sensor, an amount of force applied to a force-sensitive surface by an object; measuring a pressure associated with the force sensor; and compensating the amount of force measured by the force sensor based on the pressure associated with the force sensor. Additionally or alternatively, in some examples, the method can further comprise: tracking a baseline pressure associated with the force sensor; and determining a change in pressure associated with the force sensor by subtracting the baseline pressure from the measured pressure. Compensating the amount of force measured by the force sensor can be based on the change in pressure associated with the force sensor. Additionally or alternatively, in some examples, compensating the amount of force measured by the force sensor based on the pressure associated with the force sensor can comprise: determining a measured gap based on a capacitance formed between one or more first electrodes and one or more second electrodes of the force sensor; determining an estimated gap associated with a pressure change introduced into the electronic device by the object touching the surface based on the pressure associated with the force sensor; determining a pressure compensated gap by subtracting the estimated gap associated with the pressure change from the measured gap. Additionally or alternatively, in some examples, compensating the amount of force measured by the force sensor based on the pressure associated with the force sensor can comprise: determining the compensated amount of force based on the pressure compensated gap. Additionally or alternatively, in some examples, the estimated gap associated with the pressure change can be determined by applying a pressure compliance parameter to the pressure change.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. An electronic device comprising:
a force-sensitive surface comprising:
one or more force sensors configured to measure an amount of force applied to the force-sensitive surface by an object touching the force-sensitive surface; and
a pressure sensor coupled proximate to the one or more force sensors and configured to measure an internal pressure of the electronic device associated with one or more force measurements by the one or more force sensors; and
one or more processors coupled to the one or more force sensors and capable of:
compensating the amount of force measured by the one or more force sensors based on the internal pressure associated with the one or more force measurements by the one or more force sensors.

2. The electronic device of claim 1, wherein the one or more force sensors are capacitive force sensors including one or more first electrodes and one or more second electrodes, wherein a change in a gap between the one or more first electrodes and the one or more second electrodes due to the amount of applied force changes a capacitance formed between the one or more first electrodes and the one or more second electrodes.

3. The electronic device of claim 2, wherein:
the force-sensitive surface further comprises one or more touch sensors configured to detect the object touching the surface; and
the one or more processors are capable of compensating the amount of force in response to detecting the object touching the surface.

4. The electronic device of claim 3, wherein in response to detecting the object touching the surface, an internal pressure baseline is updated.

5. The electronic device of claim 1, wherein compensating the amount of force measured by the one or more force sensors based on the internal pressure associated with the one or more force measurements by the one or more force sensors comprises:
determining a measured gap based on a capacitance formed between one or more first electrodes and one or more second electrodes of the one or more force sensors;
determining an estimated gap associated with a pressure change introduced into the electronic device by the object touching the surface based on the internal pressure associated with the one or more force measurements by the one or more force sensors;
determining a pressure compensated gap by subtracting the estimated gap associated with the pressure change from the measured gap.

6. The electronic device of claim 5, wherein compensating the amount of force measured by the one or more force sensors based on the internal pressure associated with the one or more force measurements by the one or more force sensors comprises:
determining the compensated amount of force based on the pressure compensated gap.

7. The electronic device of claim 5, wherein the one or more processors are further capable of tracking a baseline internal pressure, and wherein determining the estimated gap associated with the pressure change comprises subtracting the baseline internal pressure from the internal pressure measured by the pressure sensor to determine the pressure change.

8. The electronic device of claim 5, further comprising:
a motion sensor configured to measure motion of the electronic device;
wherein the one or more processors are capable of:
determining an estimated gap associated with a motion change introduced into the electronic device by movement of the electronic device based on the measured motion of the electronic device;
determining a pressure and motion compensated gap by subtracting the estimated gap associated with the motion change from the pressure compensated gap; and
determining the compensated amount of force based on the pressure and motion compensated gap.

9. The electronic device of claim 5, wherein the estimated gap associated with the pressure change is determined by applying a pressure compliance parameter to the pressure change.

10. A method for compensating force measurements, the method comprising:
measuring, with a force sensor, an amount of force applied to a force-sensitive surface by an object touching the force-sensitive surface;
measuring an internal pressure of an electronic device associated with one or more force measurements by the force sensor; and
compensating the amount of force measured by the force sensor based on the internal pressure associated with the one or more force measurements by the force sensor.

11. The method of claim 10, further comprising:
tracking a baseline internal pressure associated with the force sensor; and
determining a change in pressure associated with the one or more force measurements by the force sensor by subtracting the baseline internal pressure from the measured internal pressure;
wherein compensating the amount of force measured by the force sensor is based on the change in pressure associated with the one or more force measurements by the force sensor.

12. The method of claim 10, wherein compensating the amount of force measured by the force sensor based on the internal pressure associated with the one or more force measurements by the force sensor comprises:
determining a measured gap based on a capacitance formed between one or more first electrodes and one or more second electrodes of the force sensor;
determining an estimated gap associated with a pressure change introduced into the electronic device by the object touching the surface based on the internal pressure associated with the one or more force measurements by the force sensor;
determining a pressure compensated gap by subtracting the estimated gap associated with the pressure change from the measured gap.

13. The method of claim 12, wherein compensating the amount of force measured by the force sensor based on the internal pressure associated with the one or more force measurements by the force sensor comprises:
determining the compensated amount of force based on the pressure compensated gap.

14. The method of claim 12, further comprising:
determining an estimated gap associated with a motion change associated with the force sensor;
determining a pressure and motion compensated gap by subtracting the estimated gap associated with the motion change from the pressure compensated gap; and
determining the compensated amount of force based on the pressure and motion compensated gap.

15. The method of claim 12, wherein the estimated gap associated with the pressure change is determined by applying a pressure compliance parameter to the pressure change.

16. A non-transitory computer readable storage medium storing instructions, which when executed by an electronic device including one or more processors, cause the one or more processors to perform a method for compensating force measurements, the method comprising:
measuring, with a force sensor, an amount of force applied to a force-sensitive surface by an object touching the force-sensitive surface;
measuring an internal pressure of the electronic device associated with one or more force measurements by the force sensor; and
compensating the amount of force measured by the force sensor based on the internal pressure associated with the one or more force measurements by the force sensor.

17. The non-transitory computer readable storage medium of claim 16, the method further comprising:
tracking a baseline internal pressure associated with the force sensor; and
determining a change in pressure associated with the one or more force measurements by the force sensor by subtracting the baseline internal pressure from the measured internal pressure;
wherein compensating the amount of force measured by the force sensor is based on the change in pressure associated with the one or more force measurements by the force sensor.

18. The non-transitory computer readable storage medium of claim 16, wherein compensating the amount of force measured by the force sensor based on the internal pressure associated with the one or more force measurements by the force sensor comprises:
determining a measured gap based on a capacitance formed between one or more first electrodes and one or more second electrodes of the force sensor;
determining an estimated gap associated with a pressure change introduced into the electronic device by the object touching the surface based on the internal pressure associated with the one or more force measurements by the force sensor;
determining a pressure compensated gap by subtracting the estimated gap associated with the pressure change from the measured gap.

19. The non-transitory computer readable storage medium of claim 18, wherein compensating the amount of force measured by the force sensor based on the internal pressure associated with the one or more force measurements by the force sensor comprises:
determining the compensated amount of force based on the pressure compensated gap.

20. The non-transitory computer readable storage medium of claim 18, wherein the estimated gap associated with the pressure change is determined by applying a pressure compliance parameter to the pressure change.

* * * * *